United States Patent [19]

Ely et al.

[11] Patent Number: 5,550,182

[45] Date of Patent: Aug. 27, 1996

[54] MASKING COMPOSITION FOR PROTECTING VEHICLE SURFACE FROM OVERSPRAY

[75] Inventors: Richard W. Ely, New London; James P. Gilson, Green Bay; Cathy Pawelski, New London, all of Wis.

[73] Assignee: Aqua tec Coatings Corporation, Appleton, Wis.

[21] Appl. No.: 361,968

[22] Filed: Dec. 22, 1994

[51] Int. Cl.$^6$ ........................................ C08K 5/053
[52] U.S. Cl. .................. 524/557; 524/503; 524/388
[58] Field of Search ........................ 524/557, 503, 524/388

[56] References Cited

U.S. PATENT DOCUMENTS

| | | | |
|---|---|---|---|
| 2,372,982 | 4/1945 | Richards et al. | 117/6 |
| 3,114,650 | 12/1963 | Oppenheim et al. | 117/6 |
| 3,201,274 | 8/1965 | Hobbs, Jr. | 117/128.4 |
| 3,202,554 | 8/1965 | Hornus | 148/22 |
| 3,696,498 | 10/1972 | Leontaritis et al. | 29/424 |
| 4,055,441 | 10/1977 | Taylor et al. | 7/34 |
| 4,287,103 | 9/1981 | Francis et al. | 260/17 |
| 4,347,266 | 8/1982 | Norman et al. | 427/153 |
| 4,352,835 | 10/1982 | Holbrook et al. | 427/38 |
| 4,442,140 | 4/1984 | Kawabata et al. | 427/154 |
| 4,454,266 | 6/1984 | Coughlan et al. | 524/44 |
| 4,548,967 | 10/1985 | Brown et al. | 524/56 |
| 4,612,058 | 9/1986 | Geke et al. | 134/38 |
| 4,632,848 | 12/1986 | Gosset et al. | 427/154 |
| 4,804,573 | 2/1989 | McCarthy et al. | 428/201 |
| 5,061,518 | 10/1991 | Langerbeins et al. | 427/154 |
| 5,143,949 | 9/1992 | Grogan et al. | 523/334 |
| 5,186,978 | 2/1993 | Woodhall et al. | 427/154 |
| 5,262,466 | 11/1993 | Baldi | 524/557 |
| 5,302,413 | 4/1994 | Woodhall et al. | 427/154 |
| 5,362,786 | 11/1994 | Woodhall et al. | 524/389 |

OTHER PUBLICATIONS

Aug. 1992 Martin Senour Paints, Material Safety Data Sheet, III–28.
Feb. 1962 3M Automotive Trades Division, Overspray Masking Liquid–Dry Label; Part No. Material Safety Data Sheet; Part Nos. 06847, 06851, 06856, 06857.
Cal–West Automotive Products, SLIME label.
Du Pont Company, Technical Information sheets for Elvands.
Air Products and Chemicals; Information regarding Airvol (9 pages) 051131–06856.

*Primary Examiner*—Paul R. Michl
*Assistant Examiner*—Olga Asinovsky
*Attorney, Agent, or Firm*—Michael, Best & Friedrich

[57] ABSTRACT

A masking composition for protecting a surface from paint overspray, the masking composition including: polyvinyl alcohol which is at least 98.0% hydrolyzed and has a viscosity less than about 7 centipoise in 4% aqueous solution at 68° F.; a surfactant; and water.

33 Claims, No Drawings

5,550,182

MASKING COMPOSITION FOR PROTECTING VEHICLE SURFACE FROM OVERSPRAY

BACKGROUND OF THE INVENTION

1. Field of the Invention

The invention relates to masking compositions for protecting vehicle surfaces from paint overspray.

2. Relation to Prior Art

Spraying paint onto a surface such as a vehicle body generates an undesirable paint overspray. The paint overspray can coat or spot and thus damage portions of the vehicle body which are not intended to be painted. Therefore, when painting a portion of a vehicle body, it is necessary to mask surfaces such as adjacent body panels, trim and glass from overspray.

Chemical compositions can be used to mask vehicle body surfaces from paint overspray. Typically, such a masking composition is applied as a liquid. For ease of use, the liquid is sprayed onto the surface to be masked from overspray. The liquid forms a thin film covering the protected surface, and the liquid film is allowed to dry and thus form a solid protective coating. During painting of other portions of the body, paint overspray coats the solid protective coating instead of the protected surface. After painting is complete, the coating with dry paint overspray thereon is removed from the protected surface and disposed.

U.S. Pat. No. 5,302,413 to Woodall et al. discloses a masking composition. In one embodiment, the masking composition includes partially hydrolyzed polyvinyl alcohol (PVOH), ethyl alcohol, deionized water, and a surfactant composition including a functional derivative of a fluorinated alkyl chain.

SUMMARY OF THE INVENTION

Masking compositions typically include a volatile organic solvent such as ethyl alcohol in order to aid in wetting out the surface and to cause drying in an acceptable period. As used herein "volatile organic solvent" (or hereinafter "volatile solvent") means an organic compound which evaporates or volatilizes to cause drying of a masking composition including polyvinyl alcohol. The volatile solvent is released into the atmosphere as the masking composition dries on the surface to be protected, and thus is a source of air pollutants unless the air from the masking operation is treated. The invention provides a masking composition which does not include a volatile solvent such as ethyl alcohol.

Masking compositions including partially hydrolyzed polyvinyl alcohol typically form a highly adhesive dry protective coating which is difficult to peel or cannot be peeled from a protected surface, and thus which must be washed from the surface. Masking compositions including both partially hydrolyzed polyvinyl alcohol and a volatile solvent such as ethyl alcohol form even more highly adhesive coatings which are typically even more difficult to peel, because the volatile solvent carries the masking composition into or through vehicle waxes or polishes and affords better adhesion of the masking composition to the protected surface. The invention provides a masking composition which does not include a volatile solvent, and which in some embodiments does not include partially hydrolyzed polyvinyl alcohol. In embodiments wherein the masking composition includes partially hydrolyzed polyvinyl alcohol, the composition also includes a sufficient amount of fully hydrolyzed polyvinyl alcohol to form a coating which readily peels from the protected surface.

Masking compositions including a volatile solvent are typically unevenly applied by spraying, because the volatile solvent causes premature drying of the composition in the air before contacting the surface to be protected. This is demonstrated by the masking composition having a white frothy appearance as it is sprayed onto the surface. The invention provides a masking composition which does not include a volatile solvent, and which is evenly applied by spraying without premature drying.

Masking compositions including a volatile solvent strip any wax layer from the waxed surface of a vehicle body, and thus leave the protected surface with a dull appearance, such that waxing is required to restore the surface to its previous appearance. The invention provides a masking composition which does not include a volatile solvent, and which does not strip the wax layer from a waxed surface.

Masking compositions including a volatile solvent such as ethyl alcohol typically are combustible and flammable. The invention provides a masking composition which does not include a volatile solvent, and which is not combustible or flammable.

During distribution, transportation and storage before use, a masking composition can be exposed to low temperatures causing freezing of the composition, and thus the masking composition should not form an unusable gel when thawed. The invention provides a masking composition which is usable when thawed.

Masking compositions are typically exposed to temperatures up to about 170° F. in a vehicle painting operation, when the temperature in the paint booth is raised to rapidly dry the new paint on the vehicle. Masking compositions typically include compounds which substantially volatilize at temperatures below about 170° F., and thus release volatile organic compounds into the atmosphere. The invention provides a masking composition which does not include compounds which substantially volatilize at temperatures below about 170° F., and thus does not release volatile organic compounds into the atmosphere.

More particularly, in one embodiment the invention provides a masking composition consisting essentially of polyvinyl alcohol, a surfactant and water. In one embodiment, the polyvinyl alcohol is at least 98% hydrolyzed and has a viscosity less than about 7 centipoise in 4% aqueous solution at 68° F. In one embodiment, the polyvinyl alcohol includes a portion which is at least 87% hydrolyzed and has a viscosity less than about 7 centipoise in 4% aqueous solution at 68° F., and a remaining portion which is at least 98% hydrolyzed and has a viscosity less than about 7 centipoise in 4% aqueous solution at 68° F. The total amount of polyvinyl alcohol is between about 4% and about 40% by dry weight, preferably between about 6% and about 30%, and more preferably between about 9% and about 18%, based upon the weight of the liquid composition. The amount of the surfactant is between about 0.01% and about 5% by weight, preferably between about 0.05% and about 2.0%, and more preferably between about 0.1% and about 1.0%, based upon the weight of the composition. The amount of water is between about 70% and about 96% by weight, preferably between about 73% and about 91%, and more preferably between about 76% and about 91%, based upon the weight of the masking composition.

In one embodiment, the polyvinyl alcohol consists of at least about 60% of polyvinyl alcohol which is at least 87% hydrolyzed and a remaining amount, about 40%, of polyvinyl alcohol which is at least 98% hydrolyzed. In a preferred embodiment, the polyvinyl alcohol consists of at least about 70% of polyvinyl alcohol which is at least 87% hydrolyzed and a remaining amount, about 30%, of polyvinyl alcohol which is at least 98% hydrolyzed. In one embodiment, the polyvinyl alcohol consists of at least about 80% of polyvinyl alcohol which is at least 87% hydrolyzed and a remaining amount, about 20%, of polyvinyl alcohol which is at least 98% hydrolyzed.

In one embodiment, the masking composition includes polyvinyl alcohol which has a viscosity less than about 7 centipoise in 4% aqueous solution at 68° F. and a molecular weight in the range from about 15,000 to about 27,000.

In one embodiment, the invention provides a masking composition consisting essentially of polyvinyl alcohol, a surfactant, water, a preservative and a humectant.

It is advantageous that the masking composition of the invention is evenly applied by spraying the composition onto a surface to be protected. It is also an advantage that a masking composition of the invention dries in an acceptable period of about 20 to 30 minutes, and forms a tack-free protective coating which is readily peeled from a protected surface. As used herein, "tack-free" means that the coating is dry to the touch and, when touched, does not stick to personnel or equipment. It is also advantageous that a masking composition of the invention forms a coating which is glossy and transparent. It is a further advantage that the masking composition does not include a volatile solvent such as ethyl alcohol, and thus is not combustible or flammable; volatile compounds are not released into the atmosphere as the masking composition dries; and the masking composition does not strip the wax layer from the protected surface. It is also advantageous that the masking composition can be frozen and is usable when thawed.

The invention also provides a method for protecting a portion of a vehicle body from paint overspray. The method includes the steps of: (a) spraying a masking composition including polyvinyl alcohol which is a least 98% hydrolyzed and has a viscosity less than about 7 centipoise in 4% aqueous solution at 68° F., a surfactant and water onto a surface to be protected to form a liquid film over the surface; (b) allowing the liquid film to dry to a tack-free coating and thus form a uniform protective coating over the surface; (c) painting an unprotected portion of the vehicle body; (d) allowing the paint to dry; and (e) peeling the coating having dry paint overspray thereon from the protected surface.

Other features and advantages of the invention will become apparent to those skilled in the art upon review of the following detailed description and claims.

Before one embodiment of the invention is explained in detail, it is to be understood that the invention is not limited in its application to the details of construction and the arrangement of components set forth in the following description. The invention is capable of other embodiments and of being practiced or being carried out in various ways. Also, it is to be understood that phraseology and terminology used herein is for the purpose of description and should not be regarded as limiting.

DETAILED DESCRIPTION OF A PREFERRED EMBODIMENT

The invention provides a composition and method for protecting a surface from paint overspray. The invention is particularly adapted for protecting a surface of a vehicle body from overspray, and will be described in connection with such use.

The masking composition includes polyvinyl alcohol which has a viscosity less than about 7 centipoise in 4% aqueous solution at 68° F. In one embodiment, the polyvinyl alcohol is at least 98% hydrolyzed. In one embodiment, the polyvinyl alcohol is at least 87% hydrolyzed. In one embodiment, the polyvinyl alcohol consists of at least about 60% of polyvinyl alcohol which is at least 87% hydrolyzed and a remaining amount, about 40%, of polyvinyl alcohol which is at least 98% hydrolyzed. In a preferred embodiment, the polyvinyl alcohol consists of at least about 70% of polyvinyl alcohol which is at least 87% hydrolyzed and a remaining amount, about 30%, of polyvinyl alcohol which is at least 98% hydrolyzed. In one embodiment, the polyvinyl alcohol consists of at least about 80% of polyvinyl alcohol which is at least 87% hydrolyzed and a remaining amount, about 20%, of polyvinyl alcohol which is at least 98% hydrolyzed.

Polyvinyl alcohol is available with various degrees of hydrolysis, solids contents, average molecular weights and viscosities. Polyvinyl alcohol which is from 87.0% to 90.0% hydrolyzed is typically referred to as "partially hydrolyzed", and is available with molecular weights of about 7,000 to about 90,000 and viscosities from about 3 centipoise to about 55 centipoise in 4% aqueous solution at 68° F. Polyvinyl alcohol which is from 98.0% to 98.8% hydrolyzed is typically referred to as "fully hydrolyzed", and is available with molecular weights ranging from about 7,000 to about 101,000 and viscosities ranging from about 3 to about 65 centipoise in 4% aqueous solution at 68° F. For example, fully hydrolyzed polyvinyl alcohol having an average molecular weight in the range of about 7,000 to about 13,000 typically has a viscosity in the range from about 3 to about 4 centipoise in 4% aqueous solution at 68° F. Polyvinyl alcohol which is at least 99.3% hydrolyzed is typically referred to as "super hydrolyzed", and is available with molecular weights of about 44,000 to about 101,000 and viscosities from about 28 to about 72 centipoise in 4% aqueous solution at 68° F. The following table shows viscosities (in 4% aqueous solution at 68° F.) and average molecular weights for polyvinyl alcohol of different degrees of hydrolysis.

| HYDROLYSIS (%) | VISCOSITY (cps) | MOLECULAR WEIGHT | TYPE[1] |
|---|---|---|---|
| 87.0–90.0 | 3–4 | 7,000–13,000 | P |
| 87.0–90.0 | 5–6 | 15,000–27,000 | P |
| 87.0–90.0 | 22–30 | 44,000–65,000 | P |
| 87.0–90.0 | 40–65 | 40,000–101,000 | P |
| 98.0–98.9 | 3.2–4.2 | 7,000–13,000 | F |
| 98.0–98.9 | 5.5–6.6 | 15,000–27,000 | F |
| 98.0–98.9 | 16.5–20.5 | 30,000–50,000 | F |
| 98.0–98.9 | 28.5–32.5 | 55,000–68,000 | F |
| 98.0–98.9 | 62–72 | 90,000–101,000 | F |
| 99.3 or higher | 28–72 | 50,000–101,000 | S |

[1]Types: (P) partially hydrolyzed; (F) fully hydrolyzed; (S) super hydrolyzed

In one embodiment, the polyvinyl alcohol is from 87.0% to 90.0% or partially hydrolyzed, has a viscosity between about 3 and about 4 centipoise in 4% aqueous solution at 68° C., and has an average molecular weight from about 7,000 to about 13,000. A suitable commercially available partially hydrolyzed polyvinyl alcohol is Airvol 203 (Air Products & Chemicals, Allentown, Pa.).

In one embodiment, the polyvinyl alcohol is from 98.0% to 98.8% or fully hydrolyzed, has a viscosity from about 3.2 to about 4.2 centipoise in a 4% aqueous solution at 68° C., and has an average molecular weight from about 7,000 to about 13,000. A suitable commercially available fully hydrolyzed polyvinyl alcohol is Airvol 103 (Air Products & Chemicals, Allentown, Pa.).

In one embodiment, the polyvinyl alcohol is at least 98.0% to 98.8% or fully hydrolyzed, has a viscosity from about 5.5 to about 6.6 centipoise in a 4% aqueous solution at 68° C., and has an average molecular weight from about 17,000 to about 31,000. A suitable commercially available fully hydrolyzed polyvinyl alcohol is Airvol 107 (Air Products & Chemicals, Allentown, Pa.).

In one embodiment, the polKvinyl alcohol has a viscosity less than about 7 centipoise in 4% aqueous solution at 68° F. and a molecular weight in the range from about 7,000 to about 31,000, preferably from about 15,000 to about 27,000.

Polyvinyl alcohol which has a viscosity less than about 7 centipoise in 4% aqueous solution at 68° F. has a sufficiently low viscosity for the masking composition to be evenly applied by spraying, without requiring a volatile solvent to aid in spraying or drying. Polyvinyl alcohol which has a viscosity less than about 7 centipoise in 4% aqueous solution at 68° F. can also be made with a sufficiently high polyvinyl alcohol solids content for the masking composition to dry in an acceptable period of about 20 to about 30 minutes without a volatile solvent such as ethyl alcohol to aid in drying. For example, a masking composition including polyvinyl alcohol which is at least 98.0% hydrolyzed and has a viscosity less than about 7 centipoise in 4% aqueous solution at 68° F. can be made with a solids content of at least about 12%. A masking composition including polyvinyl alcohol which is at least 98% hydrolyzed and has a viscosity less than about 7 centipoise in 4% aqueous solution at 68° F. can be evenly applied by spraying and can dry in an acceptable period. Further, a masking composition including polyvinyl alcohol which consists of at least about 60% of polyvinyl alcohol which is at least 87% hydrolyzed and a remaining amount of polyvinyl alcohol which is at least 98% hydrolyzed, is usable when thawed after being frozen by agitating the masking composition, such as by stirring or shaking, to dissolve agglomerates or gelatinous portions and thus achieve a suitable consistency for applying the masking composition. A masking composition including polyvinyl alcohol which consists of at least about 70% or more, preferably 80% or more, of polyvinyl alcohol which is at least 87% hydrolyzed and a remaining amount of polyvinyl alcohol which is at least 98% hydrolyzed, and one or more additives such as coupling agents, may be usable when thawed after being frozen without having to agitate the masking composition to achieve a suitable consistency before application.

The total amount of polyvinyl alcohol in the masking composition is between about 4% and about 40% by dry weight, preferably between about 6% and about 30%, and more preferably between about 9% and about 18%, based upon the weight of the liquid masking composition. In one embodiment, the masking composition includes between about 3% and about 25% of Airvol 203 and between about 1% and about 15% of Airvol 107, preferably between about 4% and about 20% of Airvol 203 and between about 2% and about 10% of Airvol 107, and more preferably between about 6% and about 10% of Airvol 203 and between about 3% and about 5% of Airvol 107, based upon the weight of the liquid masking composition. Polyvinyl alcohol typically is commercially available in dry, particulate form, and the amounts provided above are for polyvinyl alcohol in dry form. The dry polyvinyl alcohol is dissolved in water before being mixed with the other constituents of the composition.

The amount of water required to dissolve the polyvinyl alcohol constitutes a portion of the total amount of water (set forth below) in the masking composition. Heating the polyvinyl alcohol and water may be required to adequately dissolve the polyvinyl alcohol. For example, the polyvinyl alcohol and water can be heated to a temperature of at least about 200° F. and held at such a temperature for about 20 minutes in order to dissolve the polyvinyl alcohol.

The masking composition also includes a surfactant. The surfactant provides for the masking composition to be sprayed and to wet out and form a substantially continuous liquid film on the surface to be protected. The surfactant is effective for the masking composition to wet and form a film on the surface to be protected even though the masking composition may have a high solids content of 12% or more. The surfactant is also effective to make the dried film soluble in water and thus to permit the film to be washed off the surface by rinsing with water. Although other suitable surfactants can be used to cause the masking composition to wet out the surface to be protected, a suitable surfactant is one including sodium dioctyl sulfosuccinate. A suitable commercially available product is OT-70-PG (Cytec Industries, West Patterson, N.J.). OT-70-PG includes sodium dioctyl sulfosuccinate and has an HLB (hydrohile-lipophile balance) of about 14–20. The masking composition including sodium dioctyl sulfosuccinate may stratify when permitted to stand for a period of a few days, and thus may require agitation to provide a uniform emulsion suitable for spraying.

In one embodiment, the masking composition wets out the surface, dries to a glossy, transparent finish and does not stratify or require agitation to provide a uniform emulsion before spraying. In such an embodiment, a suitable surfactant is a mixture of a surfactant including sodium dioctyl sulfosuccinate and a surfactant including alcohol alkoxylates. A mixture of the commercially available products OT-70-PG and Plurafac RA-20 is suitable. In one embodiment, a suitable surfactant is a mixture of a surfactant including sodium dioctyl sulfosuccinate and a surfactant including alcohol alkoxylates and epoxides such as ethylene oxide and propylene oxide. A mixture of the commercially available products OT-70-PG and Plurafac RA-20 is suitable. As described above, OT-70-PG includes sodium dioctyl sulfosuccinate. Suitable alcohol alkoxylates are the linear alcohol alkoxylates. Plurafac RA-20 (BASF Corporation, Parsippany, N.J.) is a suitable commercially available product which includes alcohol alkoxylates. Plurafac RA-20 includes non-volative, 100% active, nonionic, multifunctional, alkoxylated C12-C15 ethoxyl alcohols, ethylene oxide and propylene oxide. Plurafac RA-20 has an HLB (hydrohile-lipophile balance) of about 10. Plurafac RA-20 acts as a surfactant which permits wetting out of the surface; acts as an antifoaming agent which prevents formation of foam when the masking composition is applied; acts as a humectant which makes the coating soluble in water and thus removable by rinsing with water; and acts as a rinsing aid or detergent which forms suds and thus permits the coating to be carried away from the surface by the rinse water. The amount of the surfactant in the masking composition is between about 0.01% and about 2% by weight, based upon the weight of the liquid composition. The amounts of OT-70-PG and Plurafac RA-20 in the mixture are as follows: the amount of OT-70-PG is between about 0.01% and about 1.0% by weight, preferably between about 0.05% and about 0.8%, and more preferably between about 0.1% and about 0.5%; the amount of Plurofac RA-20 is between about 0.01% and about 1.0% by weight, preferably between about 0.05% and about 0.8%, and more preferably between about 0.1% and about 0.4%, based upon the total weight of the masking composition.

The masking composition also includes water. The amount of water is between about 50% and about 95% by weight, preferably between about 62% and about 94%, and more preferably between about 79% and about 91%, based upon the weight of the masking composition. This amount includes the water which is required to dissolve the polyvinyl alcohol, i.e. the amount of water in the masking composition is reduced by the amount of water required to dissolve the dry polyvinyl alcohol. The water used in the specific embodiment herein described is tap water, and is not otherwise treated. Deionized water is not required in a masking composition of the invention. However, in other embodiments, deionized or other treated water may be used.

The masking composition also includes a preservative. Although other suitable preservatives can be used to prevent mildew and bacterial growth in the masking composition, a suitable preservative is 1-(3-chlorallyl)-3,5,7-triaxa-1-azoniaadamantane chloride solution. A suitable commercially available product is Dowicil 75 (Dow Chemical, Midland, Mich.). The amount of the preservative is between about 0.01% and about 2% by weight, preferably between about 0.03% and about 1.5%, more preferably between about 0.04% and about 1.0%, based upon the weight of the masking composition. In other embodiments, the masking composition may not include a preservative.

The masking composition also includes a humectant. As used herein "humectant" means an agent which slows film solidification when the masking agent is applied to the surface and thus provides a period for the masking composition to wet out the surface. Although other suitable humectants can be used, the humectant preferably is propylene glycol. The amount of the humectant is between about 0.1% and about 5% by weight, preferably about 0.2% and about 4%, more preferably between about 0.3% and about 3%, based upon the weight of the masking composition. In other embodiments, different humectants such as urea, glycerine, sorbitol or ethylene glycol can be used. In other embodiments, the masking composition may not include a humectant.

The masking composition may also include an antifoaming agent (hereinafter "antifoamer"). Although other suitable antifoamers can be used, a silica-based antifoamer is preferred. A suitable commercially available product is Colloids 999 (Rhone-Poulenc, Newark, N.J.). The amount of the antifoamer is between about 0.01% and about 0.6% by weight, preferably between about 0.02% and about 0.5%, and more preferably between about 0.05% and about 0.4%, based upon the weight of the masking composition. The antifoamer must remain effective for the duration of the period between manufacture and use of the masking composition, which can be up to 12 months or longer. In other embodiments, the masking composition may not include an antifoamer.

The masking composition can also include suitable dyes, odorants and other additives. For instance, fatty acids or waxes can be added to modify the peel strength of the masking composition.

In one embodiment, the masking composition includes polyvinyl alcohol which is from about 98.0% to about 98.8% or fully hydrolyzed and has a viscosity from about 3 to about 7 centipoise in 4% aqueous solution at 68° F. and a molecular weight from about 7,000 to about 27,000, water, OT-70-PG surfactant, propylene glycol (humectant), and Colloids 999 antifoaming agent. The masking composition includes from about 8.0% to about 12.0% of polyvinyl alcohol, from about 91.5% to about 81.4% of water, from about 0.3% to about 0.6% of OT-70-PG, from about 0.1% to about 5.0% of propylene glycol, and from about 0.1% to about 1.0% of Colloids 999. In such an embodiment, if allowed to stand for a period of several days the masking composition will stratify or separate and thus typically must be agitated, such as by stirring or shaking, to provide a suitable consistency for spraying.

In one embodiment, the masking composition includes polyvinyl alcohol which is from about 98.0% to about 98.8% or fully hydrolyzed and has a viscosity from about 3 to about 7 centipoise in 4% aqueous solution at 68° F. and a molecular weight from about 7,000 to about 27,000, water, OT-70-PG surfactant and Plurofac RA-20 surfactant. The masking composition includes from about 8.0% to about 12.0% of polyvinyl alcohol; from about 91.4% to about 86.1% of water; from about 0.01% to about 1.0%, preferably from about 0.05% to about 0.8%, and more preferably from about 0.1% to about 0.5% of OT-70-PG; from about 0.01% to about 1.0%, preferably from about 0.05% to about 0.8%, and more preferably from about 0.1% to about 0.4% of Plurfac RA-20; and from about 0.4% to about 1.0% of propylene glycol, based upon the weight of the liquid composition. In such an embodiment, if allowed to stand for a period of several days the masking composition will not stratify or separate and thus does not require agitation to provide a suitable consistency for spraying. Also in this embodiment, the film is readily peeled or rinsed with water from the protected surface.

Although the masking composition can be prepared in any suitable manner, in one embodiment the masking composition is made by first mixing the dry polyvinyl alcohol with water, and heating the mixture to a temperature of about 200° F. for about 20 minutes to dissolve the polyvinyl alcohol. Thereafter, the solution is cooled to at least about 100° F. or below, and suitable amounts of the preservative, surfactant, humectant and antifoamer are mixed into the polyvinyl alcohol solution. Then, the remaining water is mixed into the composition. Thereafter, the solution is packaged in suitable containers.

In one embodiment, the masking composition is prepared by first mixing the dry polyvinyl alcohol with water, adding the preservative, surfactant, humectant and anti-foaming agent, and heating the solution to a temperature of about 200° F. for a period of about 20 minutes to dissolve the polyvinyl alcohol. Thereafter, the solution is cooled to at least about 100° F. or below, and packaged in suitable containers.

The masking composition is applied by any suitable technique to form a substantially continuous liquid film over the surface to be protected. A preferred application technique is spraying the masking composition from a sprayer in an even, fine spray onto the surface to be protected. A sufficient amount of the masking composition is applied to form a substantially continuous liquid film over the surface to be protected. The masking composition is then allowed to dry on the surface to be protected. At a temperature of about 70° F. and about 50% relative humidity, a liquid film of the masking composition dries to form a uniform, tack-free protective coating in a period of about 23 minutes. Longer drying periods are required at lower temperatures. Thereafter, when other portions of the vehicle body are painted, any paint overspray will contact the protective coating. After the paint is allowed to dry, the protective coating having dry paint overspray thereon is peeled from the protected surface and disposed.

The masking composition does not include a volatile solvent such as ethyl alcohol and thus is not combustible or flammable, does not dry prematurely when sprayed, does not release volatile compounds during drying, and dries tack-free in a period of about 23 minutes. As used herein, "volatile compound" includes compounds which substantially volatilize at ambient temperatures or at temperatures up to about 170° F. 170° F. is approximately the highest temperature to which a masking composition may be exposed in a vehicle painting operation, as can occur if the temperature in the paint booth is raised to rapidly dry the new paint on the vehicle. Also because the masking composition does not include a volatile solvent, the composition does not strip the wax layer from a waxed vehicle surface, and waxing is not required to restore the finish of a previously waxed vehicle surface. Also, the dry coating does not excessively adhere to the protected surface and possesses sufficient tensile strength to be readily peeled therefrom. In another embodiment, the masking composition is washed from the protected surface by rinsing with water.

In an alternative embodiment, the masking composition includes polyvinyl alcohol which is at least 98% hydrolyzed and which has a viscosity less than about 7 centipoise in 4% aqueous solution at 68° F., a surfactant, water, an antifoamer, a preservative and a humectant. Such a masking composition provides various of the advantages of the above-described embodiment, but when thawed after being frozen typically must be agitated to dissolve agglomerates or gelatinous portions to achieve a suitable consistency before application.

In an alternative embodiment, the masking composition includes polyvinyl alcohol which is at least 87% hydrolyzed and has a viscosity less than about 7 centipoise in 4% aqueous solution at 68° F., a surfactant, water, an antifoamer, a preservative and a humectant. Such a masking composition provides various of the advantages of the above-described embodiment, but does not wet out the surface to form a smooth, pinhole-free film, and the film cannot be readily peeled from the protected surface and so must be removed by rinsing with water. Such a masking composition is usable when thawed after being frozen without requiring agitation to dissolve agglomerates or gelatinous portions to achieve a suitable consistency before application.

The invention provides a method for protecting a portion of a vehicle body from paint overspray. The method includes the steps of: (a) spraying a masking composition onto a surface to be protected to form a liquid film over the surface; (b) allowing the liquid film to dry and thus form a solid protective coating over the surface; (c) painting an unprotected portion of the vehicle body; (d) allowing the paint to dry; and (e) peeling the coating having dry paint overspray thereon from the protected surface. Any residual coating remaining on the surface may be washed off with water. The masking composition is substantially identical to the masking composition previously described herein. In one embodiment, in step (e) the coating is peeled from the protected surface by adhering masking tape or similar strippable adhesive material to the coating along an edge portion of the coating and then lifting the tape, having the coating adhered thereto, away from the surface.

The following examples are provided for the purpose of illustration, and are not to be construed as limiting the scope of the claims.

EXAMPLE 1

A masking composition of the invention, having the specific composition provided below, was compared to two commercially available masking compositions, one marketed by Cal-West Company (Los Altos, Calif.) under the trademark Slime Plus, and the other marketed by 3-M (Minneapolis, Minn.) under the trademark Dry Mask.

|  | Weight Percent |
| --- | --- |
| Airvol 107[1] | 12.0% |
| Plurafac RA-20[2] | 0.2% |
| OT-70PG[3] | 0.3% |
| propylene glycol[4] | 1.0% |
| Dowicil 75[5] | 0.5% |
| water | 86.0% |
| total | 100.00% |

[1]Airvol 107 is 98.0% to 98.9% or fully hydrolyzed polyvinyl alcohol.
[2]Plurafac RA-20 acts as a surfactant, anti-foaming agent, humectant, and detergent.
[3]OT-70PG is a surfactant.
[4]Propylene glycol is a humectant.
[5]Dowicil 75 is a preservative.

Each composition was drawn down into a thin layer on a painted metal plate with a number 36 wire wound rod. The composition of the invention dried tack-free in 23 minutes; the Slime Plus dried tack-free in 28 minutes; and the Dry Mask dried tack-free in 26 minutes. The tests were conducted at about 50% relative humidity and 70° F.

EXAMPLE 2

The following samples were applied to a painted metal panel, allowed to air dry and tested for peel strength. Samples 1–3 are embodiments of the invention, whereas samples 4–5 are not. Peel strength was measured for a 2" width of material, at a 180° angle at a rate of 12" per minute with a Twing Albert Friction/peel tester, model 225-1.

|  | SAMPLE NUMBER | | | |
| --- | --- | --- | --- | --- |
|  | 1 | 2 | 3 | 4 |
| Airvol 107 | 3.6% | 3.6 | 12.0 | -0- |
| Airvol 203[6] | 8.4% | -0- | -0- | 12.0 |
| Airvol 125[7] | -0- | 8.4 | -0- | -0- |
| OT-70PG | 0.75% | 0.75 | 0.75 | 0.75 |
| Colloids 999 | 0.4% | 0.4 | 0.4 | 0.4 |
| propylene glycol | 1.0% | 1.0 | 1.0 | 1.0 |
| Dowicil 75 | 0.5% | 0.5 | 0.5 | 0.5 |
| water | 81.35% | 81.35 | 81.35 | 81.35 |
| total | 100.00% | 100.00 | 100.00 | 100.00 |

[6]Airvol 203 is 87.0% to 89.0% or partially hydrolyzed polyvinyl alcohol.
[7]Airvol 125 is at least 99.3% or super hydrolyzed polyvinyl alcohol.

The composition of the fifth sample, which is similar to the composition disclosed in U.S. Pat. No. 5,302,413, was as follows: 8.0% of partially hydrolyzed PVOH (7.0% of Elvanol 5105 and 1.0% of Elvanol 5042), 0.1% of Triton DF-16 surfactant, 0.1% of Fluorad FC 171 surfactant, 0.5% of Fluorad FC 430 surfactant, 1.% of glycerine, 12.0% of 190 proof ethyl alcohol and 78.3% of deionized water.

The results of the peel strength tests were:

|  | SAMPLE NUMBER | | | | |
| --- | --- | --- | --- | --- | --- |
|  | 1 | 2 | 3 | 4 | 5 |
| Peel Strength (grams) | 20 | 12 | 16 | 37 | 52 |

Samples 1–3 readily peeled from the surface. Sample 4 was difficult to peel, and the strip broke during peeling. Sample 5 was very difficult to peel, and the strip continually broke during peeling. Sample 2, including fully hydrolyzed and super hydrolyzed polyvinyl alcohol, had a lower peel strength than the other samples, and thus could more readily be peeled from a protected surface than the other samples. Thus, each of samples 1–3 had sufficiently low peel strength for the masking composition to be readily peeled from the surface and sufficiently high tensile strength for the masking composition to be peeled without breaking. The peel strengths of samples 4–5 were too high and tensile strengths too low for the masking composition to be readily peeled from a protected surface without breaking.

Various features of the invention are set forth in the following claims.

What is claimed is:

1. A masking composition for protecting a surface from paint overspray, said masking composition consisting of:
   polyvinyl alcohol, said polyvinyl alcohol being at least 98.0% hydrolyzed and having a viscosity less than about 7 centipoise in 4% aqueous solution at 68° F.;
   a surfactant including sodium dioctyl sulfoccinate and alcohol alkoxylates; and
   water.

2. The masking composition as set forth in claim 1, wherein the amount of said polyvinyl alcohol is between about 4% and about 40% by dry weight, based upon the weight of the liquid composition.

3. The masking composition as set forth in claim 2, wherein the amount of said polyvinyl alcohol is between about 6% and about 30%, based upon the weight of the liquid composition.

4. The masking composition as set forth in claim 3, wherein the amount of said polyvinyl alcohol is between about 9% and about 18%, based upon the weight of the liquid composition.

5. The masking composition as set forth in claim 1, wherein the amount of said surfactant is between about 0.01% and about 3% by weight, based upon the weight of the liquid composition.

6. The masking composition as set forth in claim 5, wherein the amount of said surfactant is between about 0.1% and about 2% by weight, based upon the weight of the liquid composition.

7. The masking composition as set forth in claim 6, wherein the amount of said surfactant is between about 0.2% and about 0.8% by weight, based upon the weight of the liquid composition.

8. The masking composition as set forth in claim 1, wherein the amount of said water is between about 50% and about 95% by weight, based upon the weight of the liquid composition.

9. The masking composition as set forth in claim 8, wherein the amount of said water is between about 62% and about 94%, based upon the weight of the liquid composition.

10. The masking composition as set forth in claim 9, wherein the amount of said water is between about 79 and about 91%, based upon the weight of the liquid composition.

11. The masking composition as set forth in claim 1 and further comprising a material selected from the group consisting of: a preservative, a humectant, an antifoaming agent and combinations thereof.

12. A masking composition for protecting a surface from paint overspray, and said masking composition prior to application to the surface being a liquid which will recover to a sprayable consistency after being frozen and then thawed, said masking composition consisting of:
   polyvinyl alcohol having a viscosity less than about 7 centipoise in 4% aqueous solution at 68° F., said polyvinyl alcohol including a portion which is from 87.0% to 89% hydrolyzed and a remaining portion which is at least 98.0% hydrolyzed, said remaining portion which is at least 98.0% hydrolyzed being at least about 40% by weight of the total amount of said polyvinyl alcohol in said masking composition;
   a surfactant including sodium dioctyl sulfoccinate and alcohol alkoxylates; and
   water.

13. The masking composition as set forth in claim 12, wherein the amount of said polyvinyl alcohol is between about 4% and about 40% by dry weight, based upon the weight of the liquid composition.

14. The masking composition as set forth in claim 13, wherein the amount of said polyvinyl alcohol is between about 6% and about 30%, based upon the weight of the liquid composition.

15. The masking composition as set forth in claim 14, wherein the amount of said polyvinyl alcohol is between about 9% and about 18%, based upon the weight of the liquid composition.

16. The masking composition as set forth in claim 12, wherein the amount of polyvinyl alcohol which is at least 87.0% hydrolyzed is between about 3% and about 25%, and the amount of polyvinyl alcohol which is at least 98.0% hydrolyzed is between about 1% and about 15%, based upon the weight of the liquid composition.

17. The masking composition as set forth in claim 16, wherein the amount of polyvinyl alcohol which is at least 87.0% hydrolyzed is between about 4% and about 20%, and the amount of polyvinyl alcohol which is at least 98.0% hydrolyzed is between about 2% and about 10%, based upon the weight of the liquid composition.

18. The masking composition as set forth in claim 17, wherein the amount of polyvinyl alcohol which is at least 87.0% hydrolyzed is between about 6% and about 10%, and the amount of polyvinyl alcohol which is at least 98.0% hydrolyzed is between about 3% and about 5%, based upon the weight of the liquid composition.

19. The masking composition as set forth in claim 12, wherein the amount of said surfactant is between about 0.01% and about 3% by weight, based upon the weight of the liquid composition.

20. The masking composition as set forth in claim 19, wherein the amount of said surfactant is between about 0.1% and about 2% by weight, based upon the weight of the liquid composition.

21. The masking composition as set forth in claim 20, wherein the amount of said surfactant is between about 0.2% and about 0.8% by weight, based upon the weight of the liquid composition.

22. The masking composition as set forth in claim 12, wherein the amount of said water is between about 50% and about 95% by weight, based upon the weight of the liquid composition.

23. The masking composition as set forth in claim 22, wherein the amount of said water is between about 62% and about 94%, based upon the weight of the liquid composition.

24. The masking composition as set forth in claim 23, wherein the amount of said water is between about 79 and about 91%, based upon the weight of the liquid composition.

25. The masking composition as set forth in claim 12 and further comprising a material selected from the group consisting of: a preservative, a humectant, an antifoaming agent and combinations thereof.

26. A masking composition for protecting a surface from paint overspray, and said masking composition prior to application to the surface being a liquid which will recover to a sprayable consistency after being frozen and then thawed, said masking composition consisting of:

between about 3% and about 25% of polyvinyl alcohol which is from 87.0% to 89% hydrolyzed and has a viscosity less than about 7 centipoise in 4% aqueous solution at 68° F.;

between about 1% and about 15% of polyvinyl alcohol which is at least 98.0% hydrolyzed and has a viscosity less than about 7 centipoise in 4% aqueous solution at 68° F.;

between about 0.01% and about 3% of a surfactant including sodium dioctyl sulfoccinate and alcohol alkoxylates;

between about 50% and about 96% of water;

between about 0.01% and about 2% of a preservative; and between about 0.1% and about 5% of a humectant.

27. A method for protecting a portion of a vehicle body from paint overspray, said method comprising the steps of:

(a) spraying a masking composition onto a surface to be protected to form a liquid film over the surface, the masking composition consisting of polyvinyl alcohol which is at least 98.0% hydrolyzed and has a viscosity less than about 7 centipoise in 4% aqueous solution at 68° F., a surfactant including sodium dioctyl sulfoccinate and alcohol alkoxylates, and water;

(b) allowing the liquid film to dry and thus form a solid protective coating over the surface;

(c) painting an unprotected portion of the vehicle body;

(d) allowing the paint to dry; and (e) peeling the coating having dry paint overspray thereon from the protected surface.

28. The method as set forth in claim 27 and wherein in step (a) the polyvinyl alcohol further includes polyvinyl alcohol which is at least 87.0% hydrolyzed and has a viscosity less than about 7 centipoise in 4% aqueous solution at 68° F.

29. The masking composition as set forth in claim 1, wherein said polyvinyl alcohol has a viscosity less than about 7 centipoise in 4% aqueous solution at 68° F. and a molecular weight in the range from about 15,000 to about 27,000.

30. The masking composition as set forth in claim 12, wherein said polyvinyl alcohol has a viscosity less than about 7 centipoise in 4% aqueous solution at 68° F. and a molecular weight in the range from about 15,000 to about 27,000.

31. The masking composition as set forth in claim 26, wherein said polyvinyl alcohol has a viscosity less than about 7 centipoise in 4% aqueous solution at 68° F. and a molecular weight in the range from about 15,000 to about 27,000.

32. A masking composition for protecting a surface from paint overspray, said masking composition consisting of:

polyvinyl alcohol, said polyvinyl alcohol being at least 98.0% hydrolyzed and having a viscosity less than about 7 centipoise in 4% aqueous solution at 68° F.;

a surfactant including sodium dioctyl sulfoccinate and alcohol alkoxylates; and water.

33. A masking composition as set forth in claim 32 wherein said composition is free of volatile lower molecular weight alcohols.

* * * * *

UNITED STATES PATENT AND TRADEMARK OFFICE
CERTIFICATE OF CORRECTION

PATENT NO. : 5,550,182
DATED : August 27, 1996
INVENTOR(S) : Richard W. Ely, James P. Gilson, Cathy Pawelski It is certified that error appears in the above—identified patent and that said Letters Patent is hereby corrected as shown below:

Column 4, in the table under the column entitled "MOLECULAR WEIGHT", "40,000-101,000" should be --70,000-101,000--

Column 5, line 12, "polKvinyl" should be --polyvinyl--.

Signed and Sealed this

Nineteenth Day of November, 1996

Attest:

BRUCE LEHMAN

Attesting Officer        Commissioner of Patents and Trademarks